United States Patent [19]
Marshall et al.

[11] Patent Number: 5,551,550
[45] Date of Patent: Sep. 3, 1996

[54] ARTICLE ACCUMULATOR FOR USE WITH A ROBOTIC HAND

[75] Inventors: Robert H. Marshall, Crestwood; Gary L. Wallace, Jeffersontown, both of Ky.

[73] Assignee: Planet Products Corporation, Cincinnati, Ohio

[21] Appl. No.: 292,527

[22] Filed: Aug. 18, 1994

[51] Int. Cl.⁶ .................................................. B65G 47/29
[52] U.S. Cl. .......................................... 198/432; 198/419.3
[58] Field of Search .................................. 198/18.7, 432, 198/433, 426, 419.3, 347.1; 414/791.6

[56] References Cited

U.S. PATENT DOCUMENTS

| | | | |
|---|---|---|---|
| 2,221,845 | 11/1940 | 0aterson | 198/426 |
| 3,194,382 | 7/1965 | Nigrelli et al. | 198/419.3 |
| 3,475,877 | 11/1969 | Fuller et al. | 198/426 |
| 3,623,591 | 11/1971 | Koch et al. | 198/432 |
| 3,845,852 | 11/1974 | Langen et al. | 198/419.3 |
| 4,630,725 | 12/1986 | Steurmer et al. | 198/419.3 |
| 4,642,967 | 2/1987 | Culpepper | 198/419.3 |
| 5,147,027 | 9/1992 | Cruver | 198/419.3 |
| 5,203,444 | 4/1993 | Münch | 198/418.7 |

*Primary Examiner*—William E. Terrell
*Assistant Examiner*—Tamara Kelly
*Attorney, Agent, or Firm*—Kinney & Schenk

[57] ABSTRACT

An article accumulator is designed for use with a robotic hand. The accumulator comprises an open frame having an endless open conveyor for receiving and transporting individual aligned rows of generally flattened articles such as frozen burger patties. A receiving section of the accumulator initially receives the flattened articles in rectilinear rows. The rows of articles are then passed to a pick section of the accumulator. Operably associated with the pick section are a repositioning system and a lifting system. The repositioning system comprises an actuator, a set of plate members with vertically extending fingers, and a stop fence. The plate members are positioned below the open conveyor so that upon programmed activation, the plate members move upwardly a sufficient distance that their fingers encompass a number of articles. The fingers ensure that the articles are properly positioned. The lifting system is also positioned below the endless open conveyor holding the articles. It comprises an actuator and a set of lift rails connected thereto. The lift actuator is programmed to lift the articles above the open conveyor after they are properly positioned. While in the elevated state, a robotic hand picks them off the lift rails and deposits them into open-top cartons for distribution.

20 Claims, 12 Drawing Sheets

ARTICLE ACCUMULATOR FOR USE WITH A ROBOTIC HAND

This invention relates to an article accumulator for use with a robotic hand. More particularly, the invention relates to an article accumulator wherein properly positioned articles, especially flattened food articles such as burger patties, are picked in a stack form by a robotic hand and deposited into an open-top carton.

BACKGROUND OF THE INVENTION

Modern industrial plants are capable of mass producing all types of manufactured articles for use by other plants and by consumers. Smaller articles in particular having a low per unit cost are usually produced very efficiently. A limiting step in the process often involves container packing of the articles in a manner suitable for transport. Many manufactured articles are moved by a conveyor belt system from a production station to a packing station. Hand packing of the articles in containers such as cardboard cartons is cumbersome and, for the most part, has been replaced by automated packing machines.

Packing and shipping from food industry plants is particularly challenging since the products often must be frozen and/or hermetically sealed in a package prior to leaving the plant. Automated packaging machines for this purpose are well known. They represent a substantial improvement over antiquated hand packing processes.

Processed food articles, including meat products such as burger patties and sausage patties, for eventual sale to restaurants and institutions present spacial problems in the processing plant. The food articles are made in bulk by very efficient automated equipment. They must also be efficiently packaged in a sanitary manner for the whole process to be efficient. The articles presently are conveyed to a packaging station and loaded into cartons. Flattened articles such as the burger and sausage patties in some packaging processes are stacked in open-top cartons and shipped. Hand-loading of the cartons is very inefficient and can cause sanitation problems. Industrial robots are a much better way to package the food articles and have been used to a limited extent for this purpose.

Robots are available which are able to pick-up individual articles from a conveyor or a product accumulation station and transfer them into a packaging container. Robots used to package processed food articles, though, have not been fully satisfactory. Many food articles, especially frozen food articles are sufficiently friable that small bits of food are easily knocked loose. A sanitation problem is created in addition to an obvious wastage problem. The shape of many food articles also presents a challenge to a designer of a robotic hand. For example, picking up such commonly found food articles as round meat patties is an especially difficult maneuver for a robotic hand. Robots for this purpose are known, though they are relatively slow in packing speed because of a need for multiple pick-ups, multiple robotic arm movements and multiple drops into a container before that container is ultimately filled.

To be efficient, the food articles to be packaged must be moved to the general vicinity of the robot by a fast running conveyor and then must be precisely positioned for a hand of the robot to properly engage it. Properly positioning a series of generally flattened food articles which are inherently fragile for a robotic hand to grasp has proved very difficult. Known accumulators are not sufficiently precise in their article positioning capability to be of use with the more modern efficient robotic hands.

There is a need for an improved method of transferring articles into packaging containers for shipment to the customer. In accord with this need, there has been developed an article accumulator. The accumulator is capable of precisely positioning flattened articles. It is particularly useful with a robotic hand which is able to pick-up generally round flattened articles in a gentle, non-damaging manner. The accumulator is relatively economical to build and very efficient in its operation.

SUMMARY OF THE INVENTION

An article accumulator is specially configured for use with a robotic hand. The accumulator comprises an open frame having an endless open conveyor for receiving and transporting individual rows of flattened articles from a feed conveyor. A receiving section initially receives the articles in at least two parallel lanes. The articles are passed through the lanes in rectilinear rows to a pick section of the accumulator. Operably associated with the pick section are a repositioning system and a lifting system. The repositioning system comprises an actuator, a set of plate members connected thereto with vertically extending fingers, and a stop fence. The plate members are positioned below the open conveyor. The stop fence is operably associated with the endless open conveyor to stop movement of the articles along the conveyor to create a fully loaded array of articles on the conveyor. Programmed activation of the actuator causes the plate members to move upwardly a sufficient distance that the fingers of the plate members pass through the open conveyor and encompass a number of flattened articles. The fingers jostle the articles on the conveyor to ensure they are properly positioned. The lifting system is also positioned below the endless open conveyor holding the flattened articles. It comprises a lift actuator and a set of lift rails connected thereto. The lift actuator is programmed to lift the food articles above the conveyor after they are properly positioned by action of the lift rails passing through the open conveyor and pushing the articles upwardly. While in the elevated state, a robotic hand sequentially picks multiple flattened articles from the lift rails to form a stack of articles and then deposits that stack into an open-top carton. A minimum of robotic arm movements are used to fill the carton.

DETAILED DESCRIPTION OF THE INVENTION

The article accumulator of the invention is useful with any packaging line conveying generally flattened articles. It is used in the packaging of flattened substantially uniformly shaped food and non-food articles conducive to being picked up by a robotic hand and placed in a defined stacking configuration within a carton. The articles are also generally rounded such as circular-shaped, oval-shaped and octagonal-shaped. They should be in a rigid or semi-rigid state. Examples of food articles which are packaged with the article accumulator include hamburger patties, sausage patties, fish patties, chicken patties and biscuits.

Figure 1:
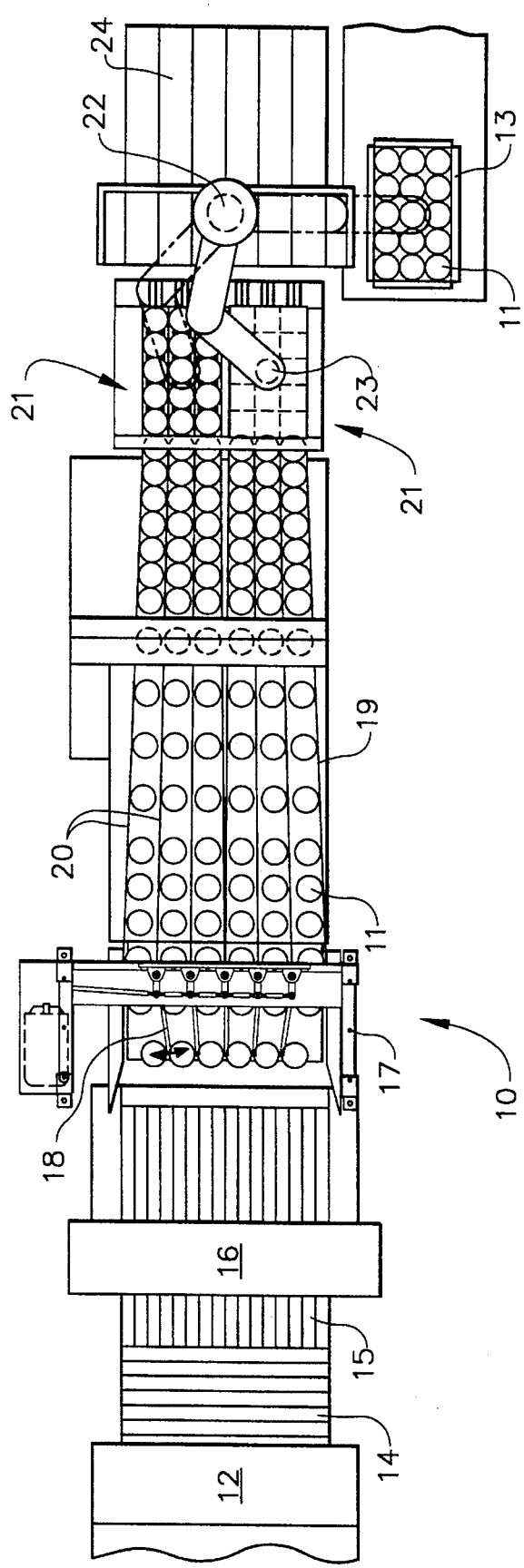
FIG. 1 is an environmental plan view of a flattened article packaging line including two juxtaposed accumulators of the invention.

With reference to FIG. 1, there is shown an environmental plan view of a food article packaging line 10. As shown and discussed in detail, the packaging line 10 illustrated is used to convey pre-made frozen hamburger patties 11 from an upstream side to a downstream side where they are picked from the line by a robotic hand and stacked in open-top cartons for shipment. For the sake of clarity, the burger patties are not illustrated in the upstream side of the packaging line 10. Pre-made hamburger, i.e. burger patties are introduced at the upstream side of the packaging line 10 into a flash freezer 12 to freeze the patties. The patties are frozen to a degree that they remain frozen as they are conveyed along the packaging line and are ultimately stacked into open-top cartons 13 at the downstream side of the packaging line. The frozen patties are moved from the flash freezer 12 onto the freezer's receiving conveyor 14. They are conveyed six across in a slightly jumbled state onto an input conveyor 15. They pass under a metal detector 16 and then enter a lane forming machine 17. A set of oscillating fingers 18 on the lane forming machine 17 force the frozen patties into a series of single file rows. As now evident in FIG. 1, six rows of frozen burger patties 11 are shown, though a lesser or greater number of rows is possible. The frozen burger patties 11 are received and guided along by a conveying flow distributor 19 having six narrowing feeder lanes 20. The flash freezer, lane forming machine and conveying flow distributor have been used in other packaging lines and are conventional in nature. At this point, and in accord with the invention, the frozen burger patties pass into two juxtaposed accumulators 21. The accumulators are positioned in a side-by-side arrangement to handle all six rows of frozen burger patties from the conveying flow distributor 19.

Each accumulator 21 receives the frozen burger patties in aligned arrays and precisely positions them as described in detail in the following paragraphs. A robot 22 with a robotic hand 23 is programmed to repeatedly pick the frozen burger patties from a pick section of the accumulator 21 to form a stacked configuration up to the capacity of the robotic hand and then swing over to a point directly above the waiting open-top carton 13. The stacked burger patties are deposited directly into the carton. The robot repeats its picking and depositing operations until eventually the carton 13 is filled. The filled cartons are sealed and transported ultimately to restaurants and other customer establishments. Any burger patties not picked by the robotic hand are dropped onto the recycle conveyor 24 for recycling or disposal. As will be apparent from the following detailed description, the frozen burger patties are very efficiently packaged.

The accumulator 21 of the food article packaging line 10 represents the invention and is described in detail hereafter and with reference to FIGS. 2–12. As evident from FIG. 2, the accumulator 21 is a single unit which accumulates the frozen burger patties in a receiving section 30 and then precisely positions the burgers in a pick section 31. The receiving section is defined generally to include that portion of the accumulator extending from the upstream edge adjacent the conveying flow distributor 19 to an approximate mid-point vertical support bar. The lifting section is defined generally to include that portion of the accumulator extending from the aforementioned vertical support bar to a downstream edge adjacent the recycle conveyor 24.

Figure 2:
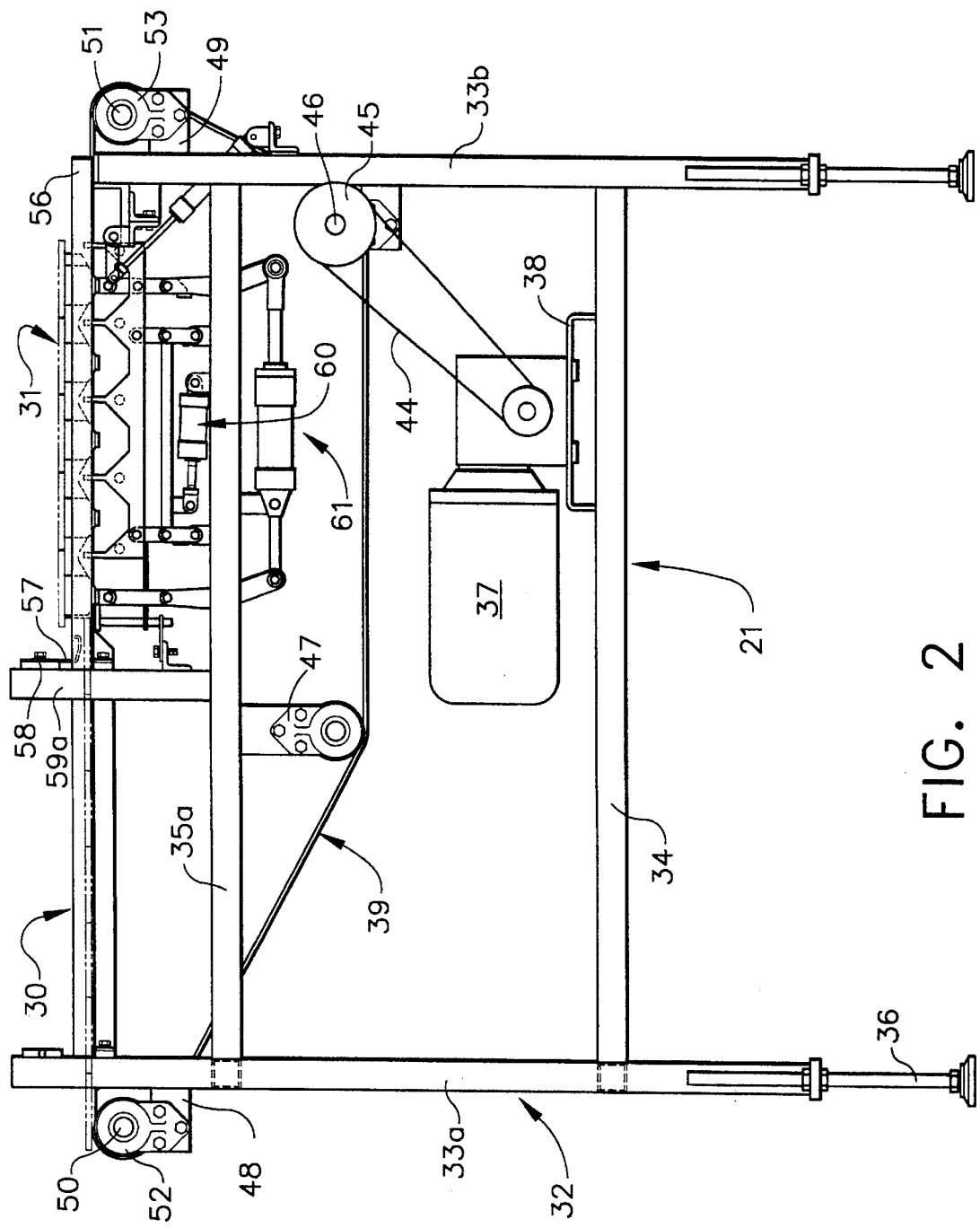
FIG. 2 is an elevational view of one of the accumulators shown in FIG. 1.
Figure 3:
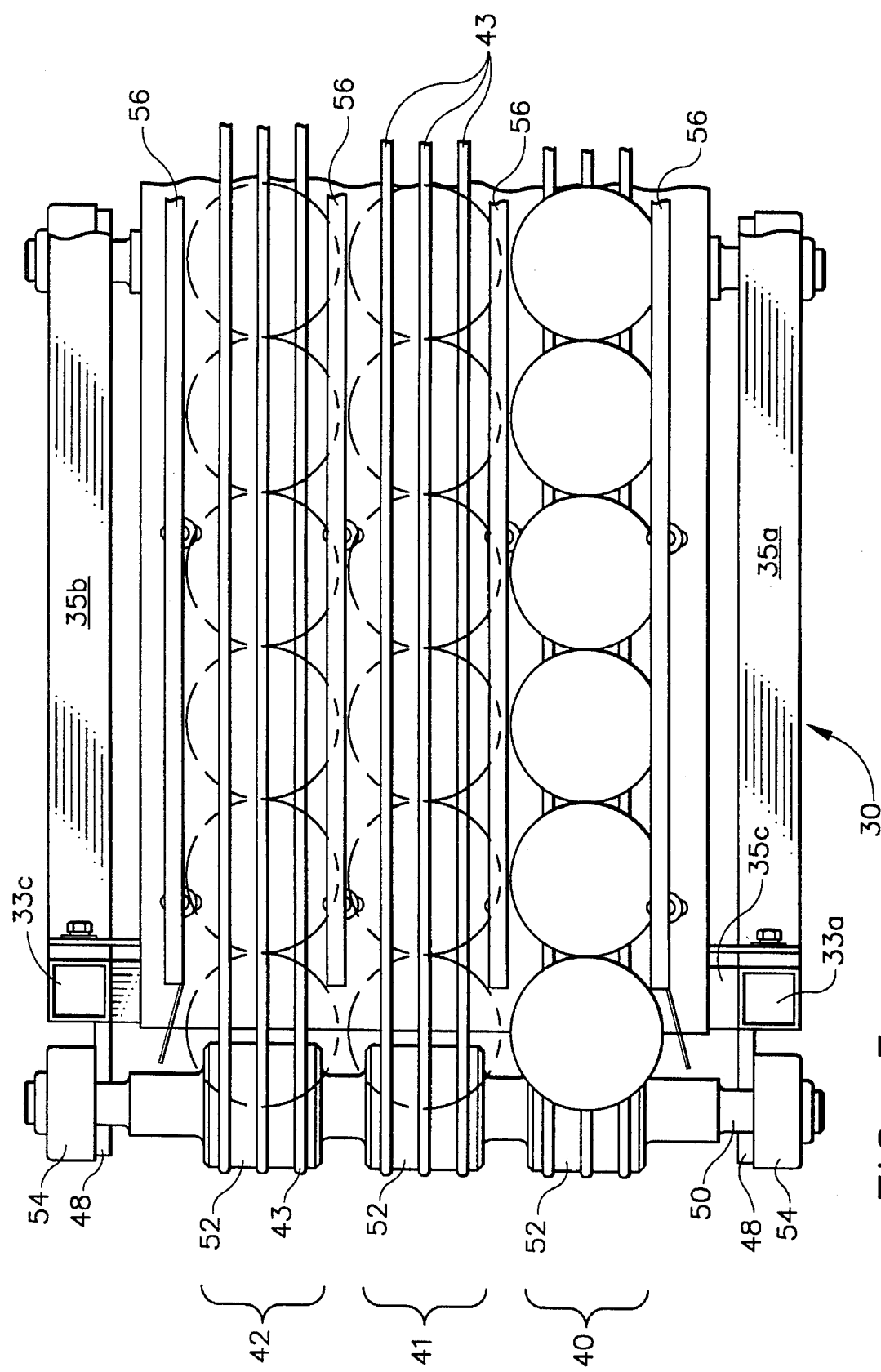
FIG. 3 is a plan view of a receiving section of the accumulator of FIG. 2.
Figure 4:
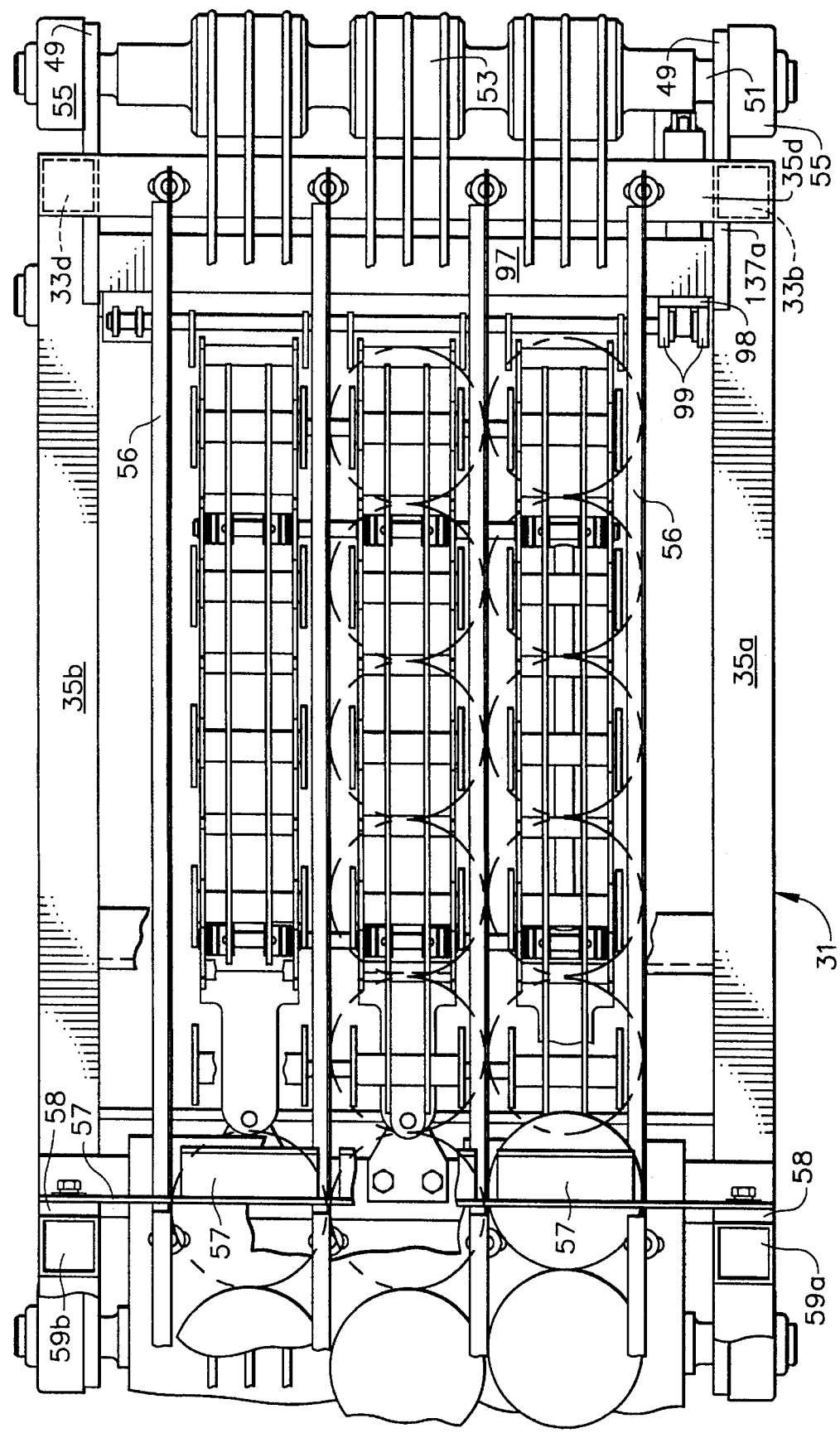
FIG. 4 is a plan view of a pick section of the accumulator of FIG. 2.

With particular reference to FIGS. 2–4, the accumulator 21 comprises an open frame 32 with four vertical support bars 33a, 33b, 33c and 33d, a set of four lower horizontal support bars 34 permanently secured to the vertical support bars, and a set of four upper horizontal support bars 35a, 35b, 35c, and 35d permanently secured to the vertical support bars. Other support bars, braces and rails are secured to the open frame to accommodate components of the accumulator as will be apparent in the following paragraphs. The open frame 32 of the accumulator 21 is structured to accommodate its working systems and is dimensioned to be positioned adjacent the conveying flow distributor 19 so as to receive the frozen burger patties. Adjustable height leg extensions 36 are useful for this purpose.

A motor 37 is mounted on the lower horizontal support bars 34 and a support platform 38 of the accumulator's open frame. The open frame 32 accommodates an endless open conveyor 39 for receiving frozen burger patties from the conveying flow distributor 19 and conveying them through its receiving section 30 and to its pick section 31. The conveyor 39 must be open to allow a manipulation of the burger patties by means which are normally under the conveyor in a rest state. The endless open conveyor 39 illustrated is a series of endless belts. From two to eight sets of spaced apart endless belts are optimally used. As evident in FIGS. 3 and 4, the conveyor 39 comprises three sets of belts 40, 41 and 42. The individual belts can be any shape, including V-shape, T-shape and O-shape. As shown, each set has three separate continuous O-ring belts 43. The spacings between the three O-ring belts of each set are such as to support a row of the frozen burger patties.

Each set of belts of the endless open conveyor 39 is driven by the motor 37 through its drive chain 44 and sprocket wheel 45. A shaft 46 rotatably holds the sprocket wheel 45. The belts travel around guide rollers mounted on shafts such that the portion of the belts conveying the frozen burger patties is kept in a horizontal plane. With reference to FIGS. 2–4, pairs of lower support brackets 47 and upper support brackets 48 and 49 are mounted on the open frame of the accumulator. The bracket pairs 48 and 49 are secured to the vertical support bars 33a and 33c and vertical support bars 33b and 33d, respectively such that the portion of the O-ring belts 43 conveying the frozen burger patties is kept in a horizontal plane. As best seen in FIGS. 3 and 4, a first one piece shaft 50 and a second one piece shaft 51 are rotatably mounted on the support brackets 48 and 49, respectively. Guide rollers 52 are on the shaft 50 and guide rollers 53 are on the shaft 51 to hold the O-ring belts 43. Bushings 54 and 55 also are mounted on the shafts 50 and 51, respectively. The O-ring belts 43 travel in unison around guide rollers (not shown) mounted on the shaft 46, the guide rollers 52 mounted on the shaft 50 and the guide rollers 53 mounted on the shaft 51. Other shafts and guide rollers (some of which are not shown) are positioned on the open frame where added support is needed, e.g. in a mid-portion of the conveyor section carrying the burger patties. The endless open conveyor runs continuously.

The receiving section 30 of the accumulator 21 receives the frozen burger patties from three feeder lanes of the conveying flow distributor 19 and retains them in the same three rows. As evident in FIG. 3, the receiving section 30 has sets of equi-spaced parallel guide rails 56 overlying the O-ring belts 43. Each set of guide rails 56 keeps the burger patties in a rectilinear row. The rows are in a parallel side-by-side array. The patties are conveyed along the open conveyor in the receiving section and pass under a L-shaped distributor bar 57 prior to entering the pick section. As seen in FIGS. 2 and 4, the distributor bar 57 is positioned directly above each set of O-ring belts so as to permit only a single patty to pass under it at a time. In effect, the top burger patty or patties of any stacked burgers is knocked off the conveyor belt and recycled. Each distributor bar 57 is permanently mounted on the open frame with the use of a spacer block 58. Framework for the distributor bar includes two midpoint vertical support bars 59a and 59b extending from the upper horizontal support bars 35a and 35b. The burger patties in the receiving section of the accumulator are in rectilinear rows and are single layer.

The frozen burger patties are conveyed into the pick section 31 of the accumulator 21 in the defined side-by-side array. In accord with this invention the patties are precisely positioned and then lifted to be properly picked by the robotic hand 23 in the desired stacking configuration. For these purposes, the pick section has a repositioning system 60 and a lifting system 61 which are programmed to separately reposition the burger patties on the open conveyor within the pick section 31 and to then lift them above the conveyor. While elevated, the patties are picked by the robotic hand and, after several picks to form for example six to nine layers of burger patties with the hand, are ultimately all deposited as stacks of burgers into the open-top cartons 13. The repositioning system is needed because of size variance in the frozen burger patties due to ingredient content, freeze conditions, weight, etc. Regardless of patty size, the repositioning system is capable of positioning the patties in a predetermined precise location on the O-ring belts as required by the robotic hand for proper operation without damage to the burger patties.

With reference to FIGS. 4–9 and 12, the accumulator's repositioning system 60 is mounted on the open frame 32 directly below the endless O-ring belts 43 in the pick section 31. The repositioning system comprises an actuator 62 and a set of six plate members 63 operably connected together. Each plate member 63 has positioning fingers 64 upwardly extending from an upright narrow elongated main body 65.

Figure 5:
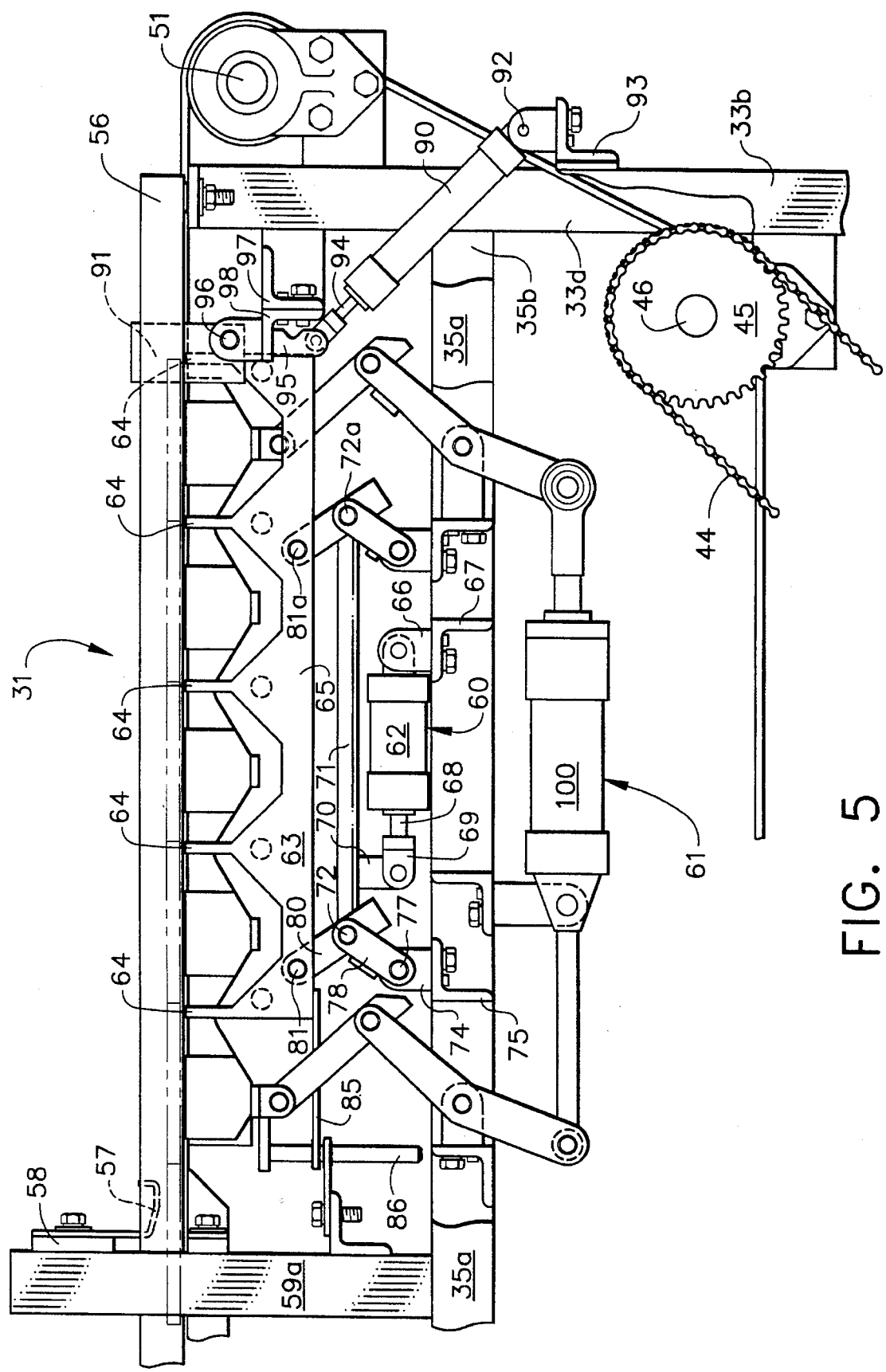
FIGS. 5–8 are elevational views of the pick section of the accumulator of FIG. 2 showing a sequence of operation steps.
Figure 9:
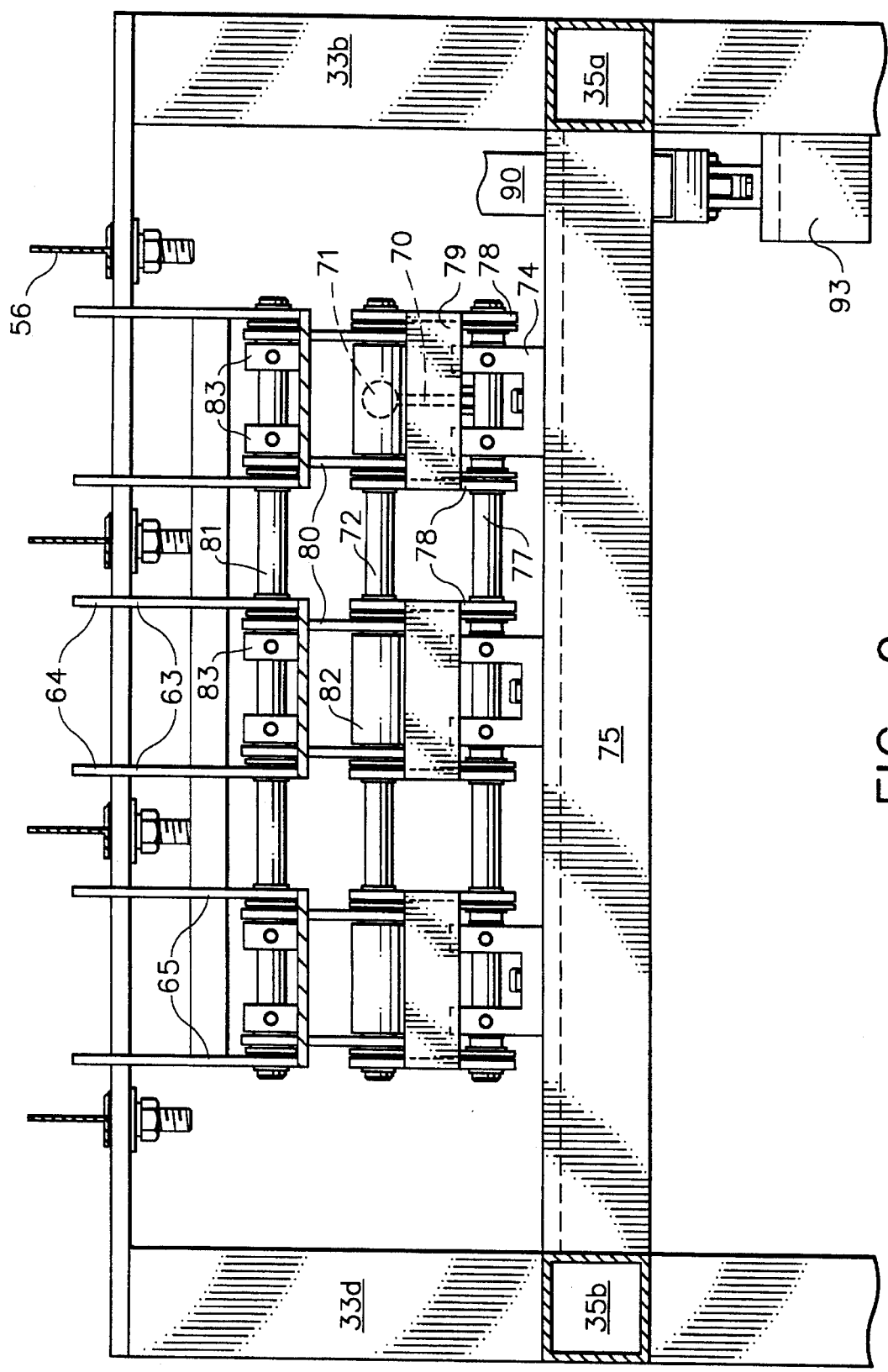
FIG. 9 is a view partially in section of the pick section of the accumulator of FIG. 8 taken along line 9—9 thereof and illustrating a flattened article repositioning system.
Figure 12:
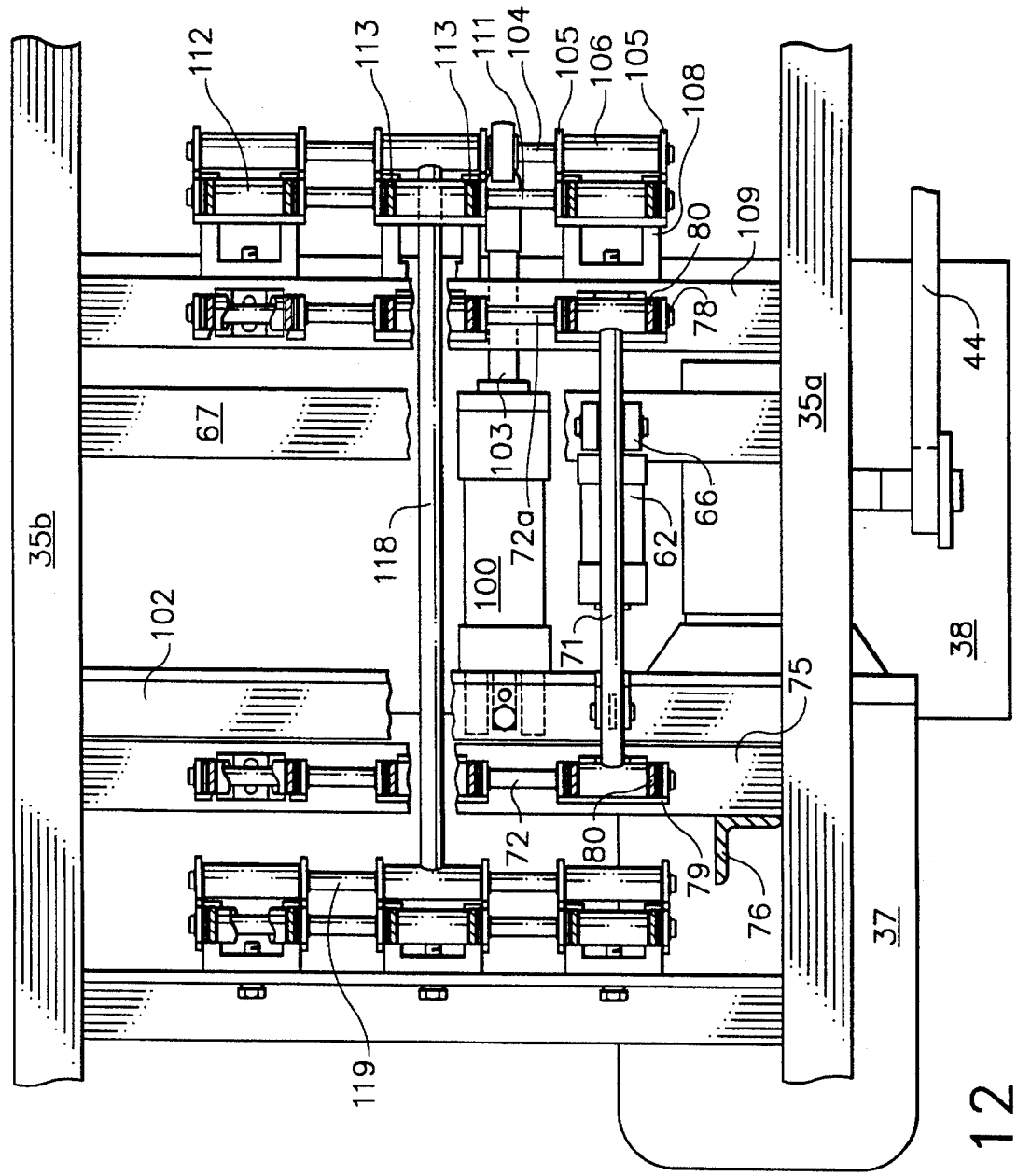
FIG. 12 is a plan view partially in section of the pick section of the accumulator taken along line 12—12 of FIG. 8 illustrating the actuators and linkages of the accumulator.

For clarity purposes, FIGS. 5, 9 and 12 are used to identify components of the repositioning system 60. The actuator 62 is pivotably attached at one end to a mount bracket 66 on a cross-bar 67 of the open frame. A piston rod 68 of the actuator is pivotably attached by a pivot bracket 69 and a bracket 70 to a connector rod 71. The connector rod 71 is substantially horizontally disposed and is pivotably connected at its ends to first horizontal shafts 72 and 72a. The connector rod 71 is used to translate reciprocating movements from the piston rod of the actuator to vertical movements through a dual set of shafts and linkage arms. Only one set is fully numbered for ease of understanding the drawings. Thus, as seen in FIGS. 9 and 12, one set has U-shaped shaft mount brackets 74 secured to a cross-bar 75 which in turn as seen in FIG. 12 is secured to vertical support bars 76 of the open frame. A second shaft 77 extends through the brackets 74. A set of linkage arms 78 pivotably attached to the second shaft 77 and on each side of a mount bracket 74 extends from the second shaft 77 to the first shaft 72 wherein the connector rod 71 is attached. A lock plate 79 is permanently attached to each set of linkage arms to cause them to act in concert. A second set of linkage arms 80 extend from the first shaft 72 to a third shaft 81. Spacer tubes 82 are placed on the first shaft 72 to maintain the desired linkage pair spacings. Lock bushings 83 on the third shaft 81 are operably associated with each of the linkage arms 80.

Six plate members 63 are pivotably mounted on the opposed third shafts 81 and 81a to act in concert. Each plate member 63 extends from an upstream third shaft 81 to beyond a downstream third shaft 81a. Sets of two plate members each are positioned on the third shafts and for the purpose of extending upwardly and encompassing each frozen burger patty on an overlying set of conveyor belts with four fingers. Accordingly, each plate member 63 has a set of fingers 64 extending upwardly. At least three, preferably from three to six, fingers on each plate member are needed. The plate members shown all have five fingers. They are laterally disposed on the plate member so as to allow a burger patty to fit between two adjacent fingers.

The plate members 63 are forced to raise straight upwardly while being maintained in a substantially horizontal plane. For this purpose, a horizontal plate 85 attached at one end to a plate member 63 extends to a vertical rod 86. The plate 85 has a hole in it and the vertical rod 86 extends through the hole. The vertical rod is stationary during operation of the plate members such that the plate members can only move vertically. The stationary vertical rod 86 is also used to ensure that lift rails of the lifting system move straight upwardly as discussed below and in more detail.

Figure 11:
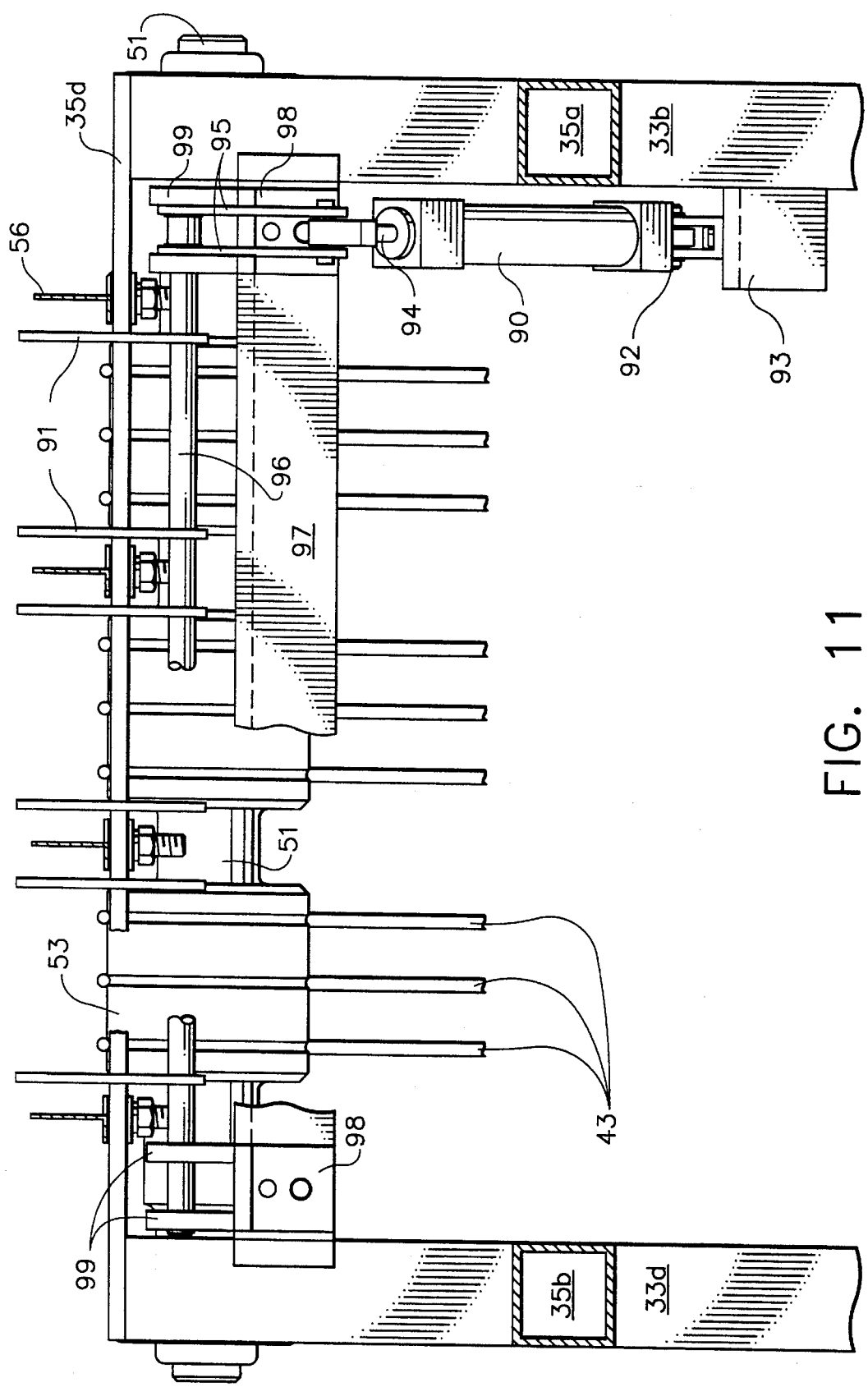
FIG. 11 is a view partially in section of the pick section of the accumulator of FIG. 6 taken along line 11—11 thereof and illustrating a flattened article back-up dropping system.

As best seen in FIGS. 5–8 and 11, the repositioning system 60 of the accumulator includes a stop fence means. The stop fence means comprises an actuator 90, stop bars 91 and linkage arms connecting the actuator to the stop bars. For clarity purposes, FIGS. 5 and 11 are used to identify components of the stop fence means. The actuator 90 is mounted by a mount bracket 92 to a support bar 93 on the open frame at one end. Its piston rod 94 is pivotably attached to linkage arms 95 which, in turn are pivotably attached to a horizonal shaft 96. A horizontal support bar 97, which is held to the open frame by mount brackets 98, holds U-shaped shaft mounts 99 and the shaft 96. The shaft 96 is downstream of the lifting system's lift rails as further discussed below. As shown in FIG. 11, sets of stop bars 91 in the form of angle brackets are rigidly attached to the shaft 96 so that each set is in alignment with each row of frozen burger patties which moves along the O-ring belts 43.

In normal operation while the packaging line is running, the stop bars 91 prevent the patties from being further conveyed. The actuator 90 is programmed to cause the stop bars 91 to move downwardly during a repositioning of the burger patties. As evident in FIGS. 5–8, the fingers 64 of the plate member 63 are slightly downstream from the front edges of the stop bars 91. When the stop bars are moved downwardly in the cycle, the burger patties are able to be conveyed forwardly to engage the last set of fingers 64 on the plate members 63. Thus, upon activation, the actuator's piston rod moves, which movement is transmitted by the linkage arms to the shaft 96. As the shaft 96 rotates, the stop bars 91 move downwardly thereby allowing any burger patties to move further forward for proper positioning purposes.

With reference to FIG. 5, initially the repositioning system 60 is in a rest position underneath the O-ring belts 43 and frozen burger patties. The stop bars have arrested the forward movement of the burger patties on the open conveyor. Upon command, the actuator's piston rod is caused to move which movement in turn is transmitted through the connector rod, the shafts, and the linkage arms to the plate members. Each plate member 63 is raised vertically an equal preset distance such that sets of fingers 64 on the plate member sets encompass an overlying burger patty (see FIG. 6). A back edge of a patty may be caught on the tops of two fingers. The conveyor runs continuously. As a result, the patties continue to move along the conveyor until the back edge falls onto the conveyor and is encompassed by a collective four fingers of a plate member set. To allow the patties to move further forward on the conveyor so as to engage two forward fingers of the collective four fingers, the actuator 90 is activated to cause the stop bars 91 to recede below the open conveyor (see FIG. 7). All the burger patties in the pick section are now in a precise position on the associated conveyor belts. The lifting system 61 discussed below is now able to lift the properly positioned burgers.

Figure 6:
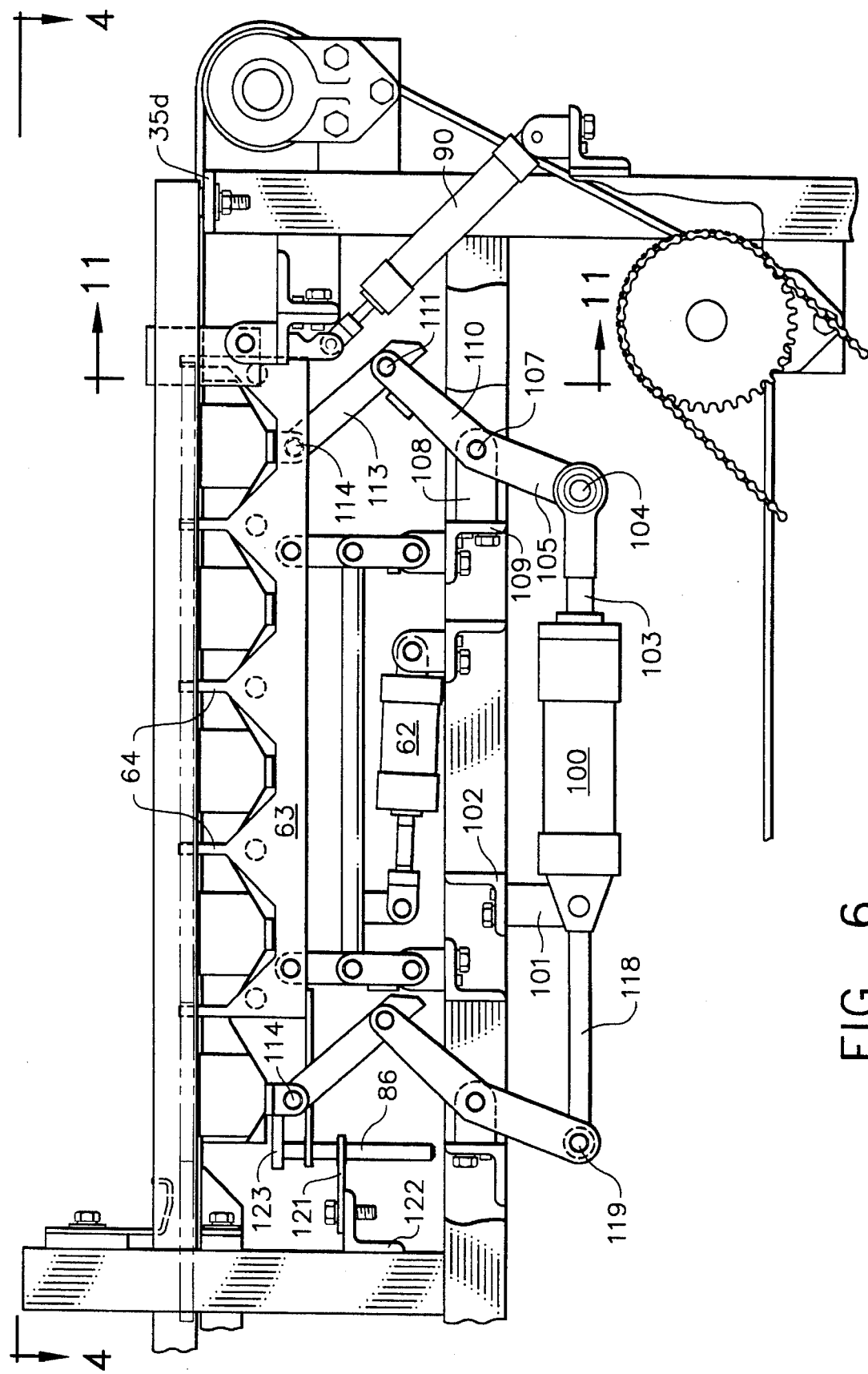
Figure 7:
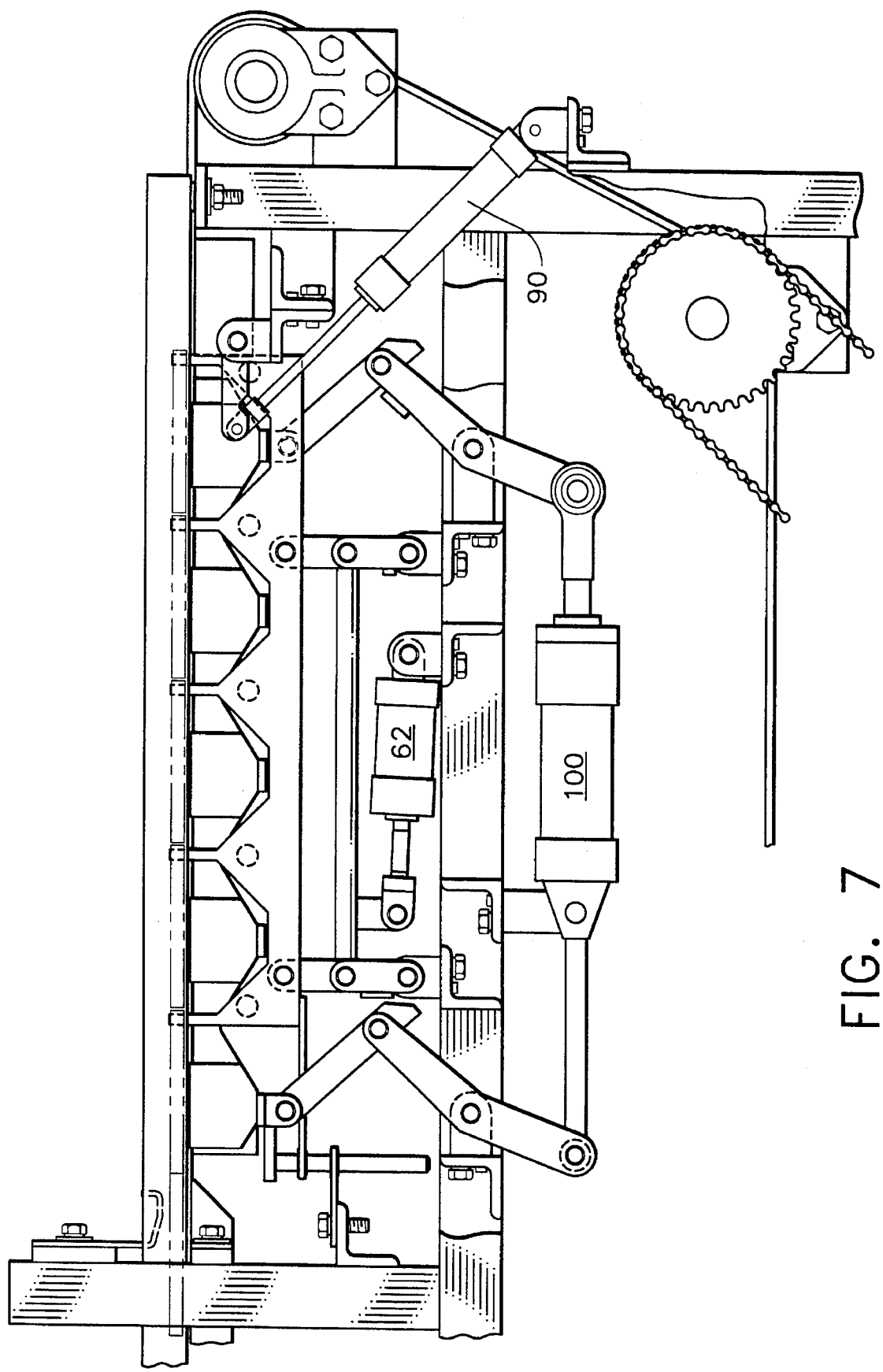
Figure 10:
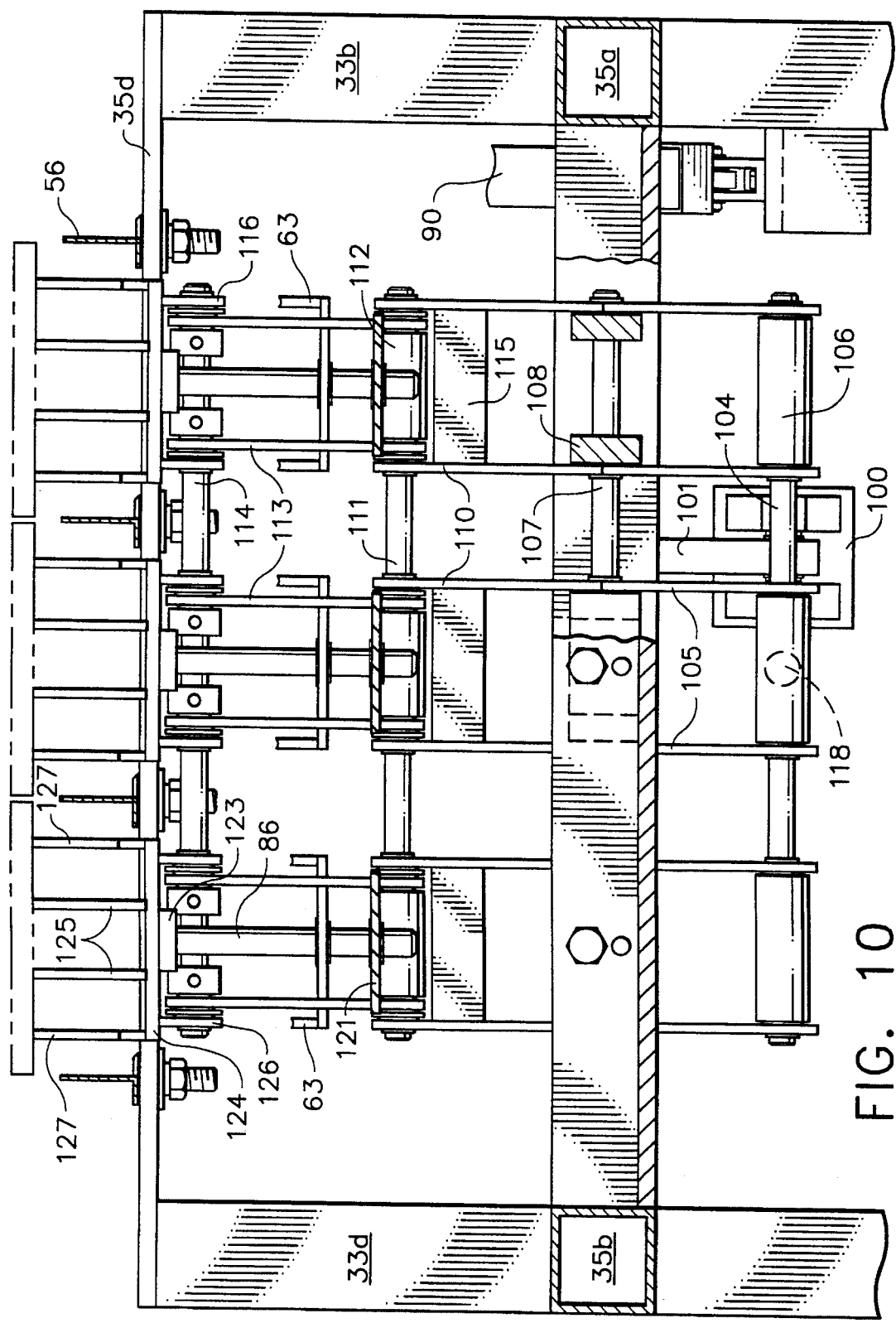
FIG. 10 is a view partially in section of the pick section of the accumulator of FIG. 8 taken along line 10—10 thereof and illustrating a flattened article lifting system.

The lifting system 61 of the accumulator 21 is designed to lift the individual burger patties off the O-ring belts 43, as precisely positioned thereon, and suspend them for a length of time sufficient for the robotic hand 23 to pick each. For clarity purposes, FIGS. 6, 10 and 12 are used to identify components of the lifting system 61. The lifting system 61 comprises an actuator 100 and a set of lift rails operably connected together. A dual set of shafts and linkage arms are used to move the lift rails substantially vertically. The actuator 100 is mounted by a mount bracket 101 to a support bar 102 of the open frame. A piston rod 103 extending from the actuator is pivotably attached to a first horizontal shaft 104. The first horizontal shaft 104 in turn has three sets of linkage arms 105 pivotably mounted on it. A spacer 106 is positioned on the shaft between each set of linkage arms. In turn, each of the linkage arms 105 is pivotably mounted on a second shaft 107. This shaft is rotatably mounted by mount brackets 108, which in turn are permanently mounted to a cross-bar 109 of the open frame 32. A second set of linkage arms 110 are pivotably mounted on the second shaft 107 and on a third shaft 111, while a third set of linkage arms 113 are pivotably mounted on the third shaft 111 and a fourth shaft 114. Spacers 112 on the shaft 111 maintain the linkage arms 113 in position. Lock plates 115 permanently mounted on each set of the second linkage arms 110 maintains a desired spacing. The fourth shaft 114 is mounted to mounting brackets 116 on an upper support member 35d of the open frame. A connecting rod 118 extends from the shaft 104 to a shaft 119 on the other set of shafts and linkage arms. It is used to transfer movement from the actuator 100 to the like set of shafts and linkage arms.

Straight vertical movement of the lifting system 61 as well as the repositioning system 60 aforediscussed is controlled by sets of the vertical rods 86. The vertical rods 86 extend through holes in a guide plate 121. A horizontal mount bar 122 is on the open frame. The guide plates 121 extend therefrom with an associated vertical rod 86. Each vertical rod 86 is attached to a mount member 123 which in turn is attached to a horizontal mount plate 124 between lift rail pairs.

The lifting system 61 further has sets of lift rails 125 which are capable of extending through the open conveyor belts, engage burger patties and elevate them above the conveyor belts. As most evident in FIG. 10, the lifting system has the horizontal mount plates 124 attached to the fourth shaft 114 by brackets 126 directly under an overlying set of conveyor belts. The spaced lift rails 125 extend substantially the full length of the accumulator pick section. Two lift rails 125 are associated with each set of O-ring belts 43 and are positioned to contact the overlying burger patties in a mid-section. Preferably, partial lift plates 127 are also provided. The partial lift plates 127 are positioned near the edges of the mount plates 124 and are intended to engage edge areas of the overlying burger patties. The lift rails and the partial lift plates are forced to raise straight upwardly while maintained in a substantially horizontal plane because of the vertical rods 86.

Figure 8:
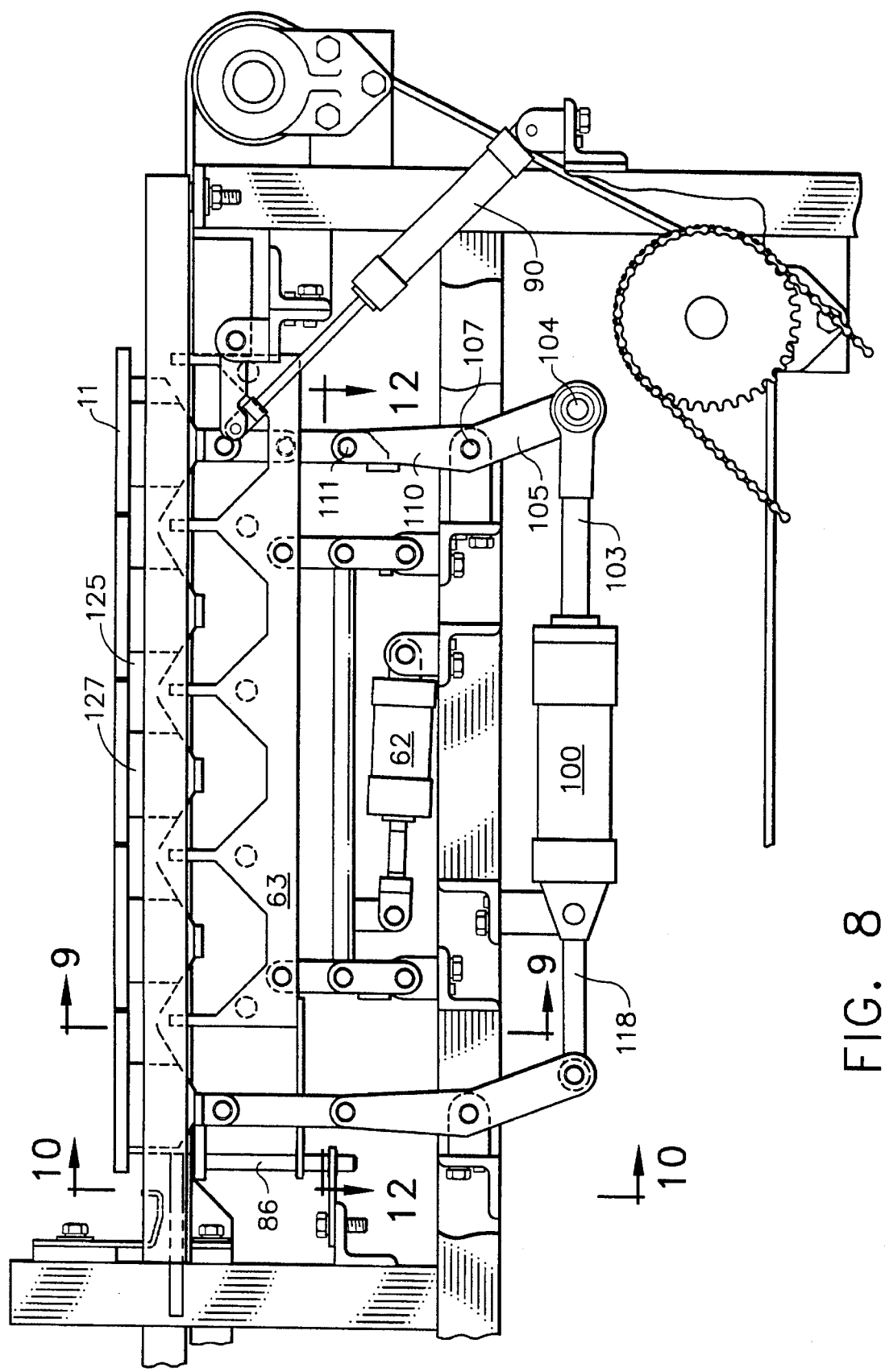

FIGS. 8 and 10 illustrate the operation of the lifting system 61. As aforediscussed with reference to FIGS. 5–7, the lifting system 61 is normally fully below the O-ring belts 43 in a rest position. Upon programmed command, the lift actuator 100 causes the linkage arms to fully extend and effectively raise the lift rails 125 and partial lift plates 127. In this position, the burger patties are removed from the endless conveyor belts and are in an elevated state. As such, the robotic hand is able to pick the patties without structural interference. Other frozen burger patties located in the receiving section of the accumulator are arrested in their movement by upstream edges of the lift rails.

The repositioning system 60 and the lifting system 61 discussed above each has an actuator and a set of linkage arms to cause a contact with the burger patties for repositioning and lifting purposes, respectively. An air or hydraulic cylinder connected directly to the plate members of the repositioning system or to the lift rails of the lifting system can as well be used. However, the described and illustrated linkage arms are highly preferred because of inherent acceleration and deceleration characteristics of the linkage arms during operation which prevents a sudden jerking of the burger patties at the end of a stroke and a resultant "flying" off their particular supporting structure. The linkage arms also provide a self locking in place for a failure mode.

Various shafts, supports, bearings and associated structures used with the accumulator of the invention are not described in detail. Such structures, however, are known and their manner of use is so within the skill of the average mechanic that further description is not needed.

Once the frozen burger patties are lifted above the O-ring belts 43 of the accumulator 21, the robotic hand 23 picks them and deposits them into the carton 13 in the form of stacks containing multiple patties, e.g. six to twelve burger patties each. This can represent multi-cycles of the robot depending on how the robotic hand is programmed. The carton is eventually loaded by the robot.

The robot is programmed to pick the frozen burger patties from specific spots. As is evident, the burger patties are aligned in straight rows and straight columns in a uniform precisely positioned arrangement. Movements of the robotic hand and the accumulator are timed to ensure each burger patty is lifted and transferred into the carton. Industrial robots for doing the general type of movements described herein are commercially available. They are readily programmed to perform the sequence of steps necessary with the known robotic hands and the preferred robotic hand described in detail below.

The preferred robotic hand 23 illustrated in the food article packaging line 10 has a manifold and four gripper finger assemblies extending therefrom. It is generally described below and is described in detail in commonly owned co-pending patent application "Robotic Hand For Transferring Articles", Ser. No. 08/083,586, filed Jun. 30, 1993, the disclosure of which is hereby incorporated by reference. The finger assemblies extend from the manifold and are used to pick-up and stack a pre-set number of burger patties. Each of the finger gripper assemblies extends from the bottom of the manifold to form an open interior square on the manifold's bottom surface. A finger mount flange is used to securely hold an end of each gripper finger assembly. The flanges can be individually attached to the manifold or can be formed as a single piece in a square shape and attached. The flange sides are equal in length and are dimensioned according to the burger patty size. The gripper finger assemblies of the robotic hand are to grasp the generally round frozen burger patties. Accordingly, the finger support members are oriented to face a side of the burger patty in a manner whereby maximum side contact of the patty is made.

An elongated inflatable bladder is dimensioned to fit in a channel of each of the finger support member. The bladder in its natural state essentially fills the channel. It has a generally rectangular shape similar in size to the channel of the finger support member. The elongated bladder has a tapered neck which extends from its main body. The neck begins near the finger mount flange and is equipped with a rigid connection tube for delivering and removing the controlled pressure air. The material used to construct the bladder must be capable of repeated flexings due to multiple inflations and deflations and also must be made of a material suitable for incidental food contact.

Collectively, the four gripper finger assemblies on the robotic hand form an open-bottom box-like shaped area. A diagonal across a plane of the box-like area is slightly larger than the diameter of the burger patties to be picked-up. The length of the box-like area is dependent on the number of burger patties to be picked-up. The robotic hand typically picks up from four to twelve burger patties and the gripper finger assemblies have a length accordingly. Upon command, the robotic hand with the bladders of the gripper finger assemblies in a deflated state drops down sufficiently far that at least the tips of the gripper finger assemblies encompass an article. Pressurized air is caused to flow to the bladders to inflate them and cause them to grasp sides of the article in a gentle but secure manner. The robotic hand raises upon command and travels to another article suspended by the accumulator's lifting system. Once properly positioned, it lowers and a negative pressure in the bladders is induced to cause the robotic hand to drop the first article directly onto the second article. The four finger assemblies are caused to extend down far enough to now encompass two articles stacked one on the other. The bladder-lined fingers are again caused to inflate and grasp the two trapped articles. The process repeats itself until the desired number of articles are stacked within the gripper finger assemblies of the robotic hand. The hand is then caused to swing to a side and steady itself over the open-top carton. The bladders of the finger assemblies are again deflated to drop the articles into the carton and still in a stack form. The robotic hand continues to pick-up other articles on the lift rails of the accumulator in the same manner and to deliver them to the open-top carton until it is filled.

The preferred robotic hand is able to gently pick-up the articles in a non-damaging manner. That is, the softness and pliability of the bladders on the gripper finger assemblies do not break off bits of the articles, e.g. the burger patties during their several inflating and deflating steps. In practice it has also been found the nature of the bladders is such that articles which vary in size from the norm are still grasped and transferred. This tolerance for size variations represents a distinct advantage in efficiency of loading with a minimum of product wastage and product shortage in the cartons. Another distinctive advantage of the robotic hand is that it is self-correcting. Any article which is picked up or assumes a non-planar position within the finger assemblies of the hand rights itself either when another article is grasped or when the stack of articles within the finger assemblies are transferred into the carton. A neatly stacked array of articles is consistently formed in the cartons.

In operation, the upstream side of the packaging line is loaded with the generally flattened articles to be packaged. The articles pass along conveyors to a conveying flow distributor to force the articles into side-by-side rectilinear rows of articles. The separate rows of articles enter the accumulator where they are received and then initially repositioned on the endless open conveyor in precise positions by the accumulator's repositioning system. They are then lifted from the endless open conveyor by lift rails of the accumulator's lifting system so as to be elevated above the conveyor. The robotic hand of the robot picks the articles from the lift rails and forms a stacking configuration. The robotic hand ultimately swings over to an open-top carton and deposits its articles into the carton. The robot repeats its operations until the carton is filled.

The accumulator of the invention has been described in detail and with particular reference to the drawings. Various modifications and changes can be made to the described invention. All such modifications and changes of an obvious nature are considered within the scope of the appended claims.

What is claimed is:

1. An accumulator for receiving and holding generally flattened articles in a precise position for pick-up by a robotic hand, said accumulator comprising:

(a) an open frame for operably positioning to an input conveyor of an article packaging line;

(b) an endless open conveyor mounted on the open frame to receive rows of generally flattened articles from the input conveyor of the article packaging line and move the articles to the robotic hand;

(c) a repositioning system mounted on the open frame in operable association with the generally flattened articles on the endless open conveyor, said repositioning system having (i) an actuator, and (ii) a set of plate members for each row of articles operably connected to said actuator, wherein each plate member has at least three vertically extending fingers of sufficient length to extend through the endless open conveyor at preset intervals such that programmed activation of the actuator causes the vertically extending fingers of the plate members to raise upwardly to encompass a set of the articles and reposition them on the endless open conveyor in precise spots; and (d) a lifting system mounted on the open frame in operable association with the generally flattened articles on the endless open conveyor, said lifting system having (i) an actuator, and (ii) a set of lift rails operably connected to said actuator and capable of engaging the articles and lifting them above the endless open conveyor such that programmed activation of the actuator causes the lift rails to move from a position below the endless open conveyor upwardly through said endless open conveyor to engage the articles and lift them above said endless open conveyor for a time sufficient for the robotic hand to pick said articles from the lift rails.

2. The accumulator of claim 1 wherein the endless open conveyor is a plurality of sets of spaced apart endless belts wherein each set of spaced apart narrow endless belts is capable of holding the individual rows of the generally flattened articles.

3. The accumulator of claim 2 further wherein the repositioning system has two substantially parallel plate members for each row of generally flattened articles on one of the sets of spaced apart endless belts such that one of said two plate members is mounted near an edge of an overlying row of articles and another of said plate members is mounted near an opposite edge of the overlying row of articles.

4. The accumulator of claim 3 wherein the endless belts are O-ring belts.

5. The accumulator of claim 3 wherein each plate member of the repositioning system has from three to six vertically extending fingers.

6. The accumulator of claim 1 wherein the endless open conveyor is capable of receiving from two to eight rows of the generally flattened articles and there are from two to eight sets of spaced apart endless belts wherein each set of the endless belts conveys a row of the articles.

7. The accumulator of claim 1 wherein the endless open conveyor runs continuously.

8. The accumulator of claim 1 further wherein the actuator of the repositioning system is operably connected to the plate members by linkage arms and the actuator of the lifting system is operably connected to the lift rails by linkage arms.

9. The accumulator of claim 8 wherein the repositioning system further comprises a stop fence mounted on the open frame to prevent forward movement of the generally flattened articles on the endless open conveyor and aid in repositioning of the articles.

10. The accumulator of claim 9 wherein the stop fence includes (i) an actuator and (ii) a set of stop bars for each row of articles operably connected to said actuator.

11. An accumulator for receiving and holding generally flattened articles in a precise position for pick-up by a robotic hand, said accumulator comprising:

(a) an open frame for operably positioning to an input conveyor of an article packaging line;

(b) an endless open conveyor mounted on the open frame to receive rows of generally flattened articles from the input conveyor of the article packaging line and move the articles to the robotic hand;

(c) a repositioning system mounted on the open frame in operable association with the generally flattened articles on the endless open conveyor, said repositioning system having (i) an actuator, (ii) a set of plate members for each row of articles, wherein each plate member has at least three vertically extending fingers of sufficient length to extend through the endless open conveyor at preset intervals, and (iii) linkage arms operably connecting the actuator to the plate members such that programmed activation of the actuator extends the linkage arms thereby causing the vertically extending fingers of the plate members to move upwardly to encompass a set of the articles and reposition them on the endless open conveyor in precise spots; and (d) a lifting system mounted on the open frame in operable association with the generally flattened articles on the endless open conveyor, said lifting system having (i) an actuator, (ii) a set of lift rails capable of engaging the articles and lifting them above the endless open conveyor, and (iii) linkage arms operably connecting the actuator to the lift rails such that programmed activation of the actuator extends the linkage arms thereby causing the lift rails to move from a position below the endless open conveyor upwardly through said endless open conveyor to engage the articles and lift them above said endless open conveyor for a time sufficient for the robotic hand to pick said articles from the lift rails.

12. The accumulator of claim 11 wherein the endless open conveyor is a plurality of sets of spaced apart endless O-ring belts wherein each set of spaced apart narrow endless belts is capable of holding the individual rows of the generally flattened articles.

13. The accumulator of claim 11 wherein the repositioning system has dual sets of the linkage arms to cause the plate members to move upwardly.

14. The accumulator of claim 11 wherein the lifting system has dual sets of the linkage arms to cause the lifting rails to move upwardly.

15. An accumulator for receiving and holding generally flattened and rounded burger patties in a precise position for pick-up by a robotic hand, said accumulator comprising:

(a) an open frame for operably positioning to an input conveyor of a burger patty packaging line;

(b) an endless open conveyor mounted on the open frame to receive rows of generally flattened and rounded burger patties from the input conveyor of the packaging line and move the burger patties to the robotic hand;

(c) a repositioning system mounted on the open frame in operable association with the generally flattened burger patties on the endless open conveyor, said repositioning system having (i) an actuator, (ii) a set of plate members for each row of burger patties, wherein each plate member having at least three vertically extending fingers of sufficient length to extend through the endless open conveyor at preset intervals, and (iii) linkage arms operably connecting the actuator to the plate members such that programmed activation of the actuator causes the vertically extending fingers of the plate members to raise upwardly to encompass a set of burger patties and reposition them on the endless open conveyor in precise spots; and (d) a lifting system mounted on the open frame in operable association with the generally flattened burger patties on the endless open conveyor, said lifting system having (i) an actuator, (ii) a set of lift rails capable of engaging the burger patties and lifting them above the endless open conveyor, and (iii) linkage arms operably connecting the actuator to the lift rails such that programmed activation of the actuator causes the lift rails to move from a position below the endless open conveyor upwardly through said endless open conveyor to engage the burger patties and lift them above said endless open conveyor for a time sufficient for the robotic hand to pick said food articles from the lift rails.

16. The accumulator of claim 15 wherein the endless open conveyor is a plurality of sets of spaced apart endless belts wherein each set of spaced apart endless belts is capable of holding the individual rows of the generally flattened and rounded burger patties.

17. The accumulator of claim 16 wherein the repositioning system further comprises a stop fence mounted on the open frame to prevent forward movement of the burger patties on the endless open conveyor and aid in repositioning of the burger patties.

18. The accumulator of claim 17 wherein the stop fence includes (i) an actuator and (ii) a set of stop bars for each row of burger patties operably connected to said actuator.

19. The accumulator of claim 18 wherein the repositioning system has dual sets of the linkage arms to cause the plate members to move upwardly.

20. The accumulator of claim 19 wherein the lifting system has dual sets of the linkage arms to cause the lifting rails to move upwardly.

* * * * *